(12) United States Patent
Appleby et al.

(10) Patent No.: US 7,451,023 B2
(45) Date of Patent: Nov. 11, 2008

(54) COLLABORATIVE SYSTEM FOR A TEAM OF UNMANNED VEHICLES

(75) Inventors: Brent D. Appleby, Holliston, MA (US); Jerry L. Franke, Voorhees, NJ (US); Stephen M. Jameson, Wilmington, DE (US); Adam Jung, Owego, NY (US); Robert J. Szczerba, Endicott, NY (US); Joel J. Tleon, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 377 days.

(21) Appl. No.: 11/188,830

(22) Filed: Jul. 25, 2005

(65) Prior Publication Data
US 2007/0021880 A1 Jan. 25, 2007

(51) Int. Cl.
*G06F 17/00* (2006.01)
*G05D 1/00* (2006.01)

(52) U.S. Cl. .......................... 701/24; 701/120
(58) Field of Classification Search ........................ None
See application file for complete search history.

(56) References Cited

U.S. PATENT DOCUMENTS

| | | | |
|---|---|---|---|
| 5,340,056 A | 8/1994 | Guelman et al. | |
| 5,367,456 A * | 11/1994 | Summerville et al. | 701/24 |
| 5,819,188 A | 10/1998 | Vos | |
| 6,072,433 A | 6/2000 | Young et al. | |
| 6,085,127 A | 7/2000 | Vos | |
| 6,122,572 A | 9/2000 | Yavnai | |
| 6,338,011 B1 | 1/2002 | Furst et al. | |
| 6,377,875 B1 | 4/2002 | Schwaerzler | |
| 6,389,335 B1 | 5/2002 | Vos | |
| 6,493,609 B2 | 12/2002 | Johnson | |
| 6,497,169 B1 | 12/2002 | Khosla | |
| 6,665,594 B1 | 12/2003 | Armstrong | |
| 6,672,534 B2 | 1/2004 | Harding et al. | |
| 6,694,228 B2 | 2/2004 | Rios | |
| 6,711,477 B1 | 3/2004 | Johnson et al. | |
| 6,724,340 B1 | 4/2004 | Carlos et al. | |
| 6,819,982 B2 | 11/2004 | Doane | |
| 6,842,674 B2 * | 1/2005 | Solomon | 701/23 |
| 6,842,899 B2 | 1/2005 | Moody et al. | |
| 6,859,927 B2 | 2/2005 | Moody et al. | |
| 7,047,861 B2 * | 5/2006 | Solomon | 89/1.11 |

(Continued)

*Primary Examiner*—Michael J. Zanelli
(74) *Attorney, Agent, or Firm*—Trolli, Sundheim, Covell & Tummino LLP (57) ABSTRACT

A system collaboratively and autonomously plans and controls a team of unmanned vehicles within an environment. A mission planning component creates a mission plan for a plurality of members of the team of unmanned vehicles. The mission planning component creates a task plan for each member based on the mission plan. A collaboration component assigns members to the team and roles for the assigned members. The collaboration component updates membership and roles of the members based on the changing situation of the environment. A situational awareness component evaluates the changing situation of the environment based on information from the assigned members of the team. A contingency management component monitors the changing situation of the environment. The contingency management component monitors changes of capabilities of the assigned members of the team and execution of the mission plan and task plans. The contingency management component determines whether to update any of the group consisting of the mission plan and the task plans. A vehicle management component controls movement of each assigned member based on the task plan of each assigned member.

20 Claims, 10 Drawing Sheets

U.S. PATENT DOCUMENTS

| | | | |
|---|---|---|---|
| 7,236,861 B2 * | 6/2007 | Paradis et al. | 701/24 |
| 2002/0026340 A1 | 2/2002 | Kauffman | |
| 2003/0213358 A1 | 11/2003 | Harding | |
| 2004/0030448 A1 | 2/2004 | Solomon | |
| 2004/0030463 A1 * | 2/2004 | Stockdale et al. | 701/3 |
| 2004/0044444 A1 | 3/2004 | Johnson et al. | |
| 2004/0061595 A1 | 4/2004 | Yannone et al. | |

* cited by examiner

COLLABORATIVE SYSTEM FOR A TEAM OF UNMANNED VEHICLES

FIELD OF INVENTION

The present invention relates to a system for collaborating operation of vehicles, and more specifically, to a system for autonomously collaborating teams of unmanned vehicles.

BACKGROUND OF THE INVENTION

Conventional Unmanned Aerial Vehicles (UAVs) operate in various environments and terrains. Future UAV teams are envisioned to be highly autonomous, not requiring constant attention from a control station. These autonomous UAV teams will likely communicate over a radio frequency link with the control base station. If several autonomous UAVs are operating as part of a team, these UAV team members will likely communicate with each other over a communication network as well. These UAV members will likely be required to inform each other of their respective and absolute positions and flight plans so that they operate in a coordinated manner and, since these UAV members are operating autonomously, to continually adjust flight plans to react to the environment, the terrain, and to enemy threats. Each UAV member in the team would communicate at unpredictable times with other members of the team asynchronously.

Sometimes a UAV using the most available data rate may not be the UAV with the highest priority, or critical mission need. At worst, the degradation of communications may persist for a period that may degrade the UAV team's critical mission effectiveness.

Autonomous systems also may be desired to be aware of their environment and adapt plans based on changes in their understanding of their environment. Control, therefore, must be flexible, both in development and in execution. A autonomous system may be given objectives to achieve. These objectives may be as simple as monitor state and report problems, or complex, for example, assault and capture a target area.

Additionally, the system may be given constraints such as flight corridors, acceptable risk, or authorized targets. A challenge may be to meld these objectives and constraints with the environmental state and the system state to plan and execute a mission plan in order to achieve the given objectives without violating the constraints.

Furthermore, an autonomous system may itself consist of autonomous subsystems. Thus, the autonomy may also be collaborative, coordinating multiple autonomous subsystems (i.e., vehicles, etc.) to act as a single system. In addition, a team of unmanned vehicles may have access to assets external to the team that would aid in performance and execution of the mission plan. These assets may also be used in concert with the team.

Conventional approaches focus on individual autonomy, ignoring an important facet of collaborative autonomy. It is advantageous to intermingle collaborative aspects into an autonomous system sooner rather than later because many environmental factors may change in a collaborative environment.

For example, a system planning for a team of autonomous assets may evaluate heterogeneous and dynamic asset attributes that may themselves execute autonomous decisions based on previously unknown information thereby impacting a team's mission plan. It would be advantageous for team planning to recognize and process this impact.

Conventional approaches are monolithic (i.e., a single control system that performs all the functions required). This approach fails to recognize different disciplines needed to perform the various functions. For example, the conventional system requires awareness of its environment. Thus, the conventional system may need to both estimate probabilities in a data rich environment and optimize courses of action from those estimates for effecting a change to the data rich environment.

SUMMARY OF THE INVENTION

An example system in accordance with the present invention collaboratively and autonomously plans and controls a team of unmanned vehicles within an environment. The system includes a mission planning component, a collaboration component, a situational awareness component, a contingency management component, and a vehicle management component. The mission planning component creates a mission plan for a plurality of members of the team of unmanned vehicles. The mission planning component creates a task plan for each member based on the mission plan. The mission planning component deconflicts the task plans based on a changing situation of the environment. The mission planning component updates the mission plan and the task plans based on the changing situation of the environment. The collaboration component assigns members to the team and roles for the assigned members. The collaboration component updates membership and roles of the members based on the changing situation of the environment. The situational awareness component evaluates the changing situation of the environment based on information from the assigned members of the team. The contingency management component monitors the changing situation of the environment. The contingency management component monitors changes of capabilities of the assigned members of the team and execution of the mission plan and task plans. The contingency management component determines whether to update any of the group consisting of the mission plan and the task plans. The vehicle management component controls movement of each assigned member based on the task plan of each assigned member.

An example computer program product in accordance with the present invention collaboratively and autonomously plans and controls a team of unmanned vehicles within an environment. The computer program product includes: a first instruction for creating a mission plan for a plurality of members of the team of unmanned vehicles; a second instruction for creating a task plan for an each member based on the mission plan; a third instruction for deconflicting the task plans based on a changing situation of the environment; a fourth instruction for updating the mission plan and the task plans based on the changing situation of the environment; a fifth instruction for assigning members to the team and roles for the assigned members; a sixth instruction for updating membership and roles of the members based on the changing situation of the environment; a seventh instruction for evaluating the changing situation of the environment based on information from the assigned members of the team; an eighth instruction for monitoring the changing situation of the environment, changes of capabilities of the assigned members of the team, and execution of the mission plan and task plans; a ninth instruction for determining whether to update any of the group consisting of the mission plan and the task plans; and a tenth instruction for controlling movement of each assigned member based on the task plan of each assigned member.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF AN EXAMPLE EMBODIMENT

A system in accordance with the present invention may autonomously collaborate and coordinate teams of unmanned vehicles and members of those teams under the command of a Warfighter. Unmanned teams may extend the vision and the reach of the Warfighter. However, the Warfighter may expend an amount of time managing these unmanned vehicles such that the Warfighter may lose effectiveness as a Warfighter.

Autonomy may relieve the Warfighter of this burden. By moving the Warfighter's role from control to command, unmanned systems may move from force extension to force expansion. Collaboration provided by the system may transform the operation of an unmanned system of vehicles from force expansion to force multiplication. Thus, a Warfighter may perform its duties more effectively, more successfully, and more decisively.

The system provides an architecture for autonomous planning and control of collaborating teams of unmanned vehicles. The architecture provides collaboration with teammates and external assets by incorporating elements of collaboration into various components and dedicating a component to this purpose. The system also distinguishes different disciplines thereby facilitating successful development and execution. Conventional architectures may lack or underrepresent these elements.

The system may include six components including one dedicated solely to collaborative functionality. The system may be scalable—instantiated on multiple systems. The system may allow the growth of a collaborative team without placing undue burden on a central control point—each vehicle represents a teammate rather than a subordinate.

As stated above, one component may be dedicated to collaboration. The other components may involve individual vehicle autonomy. Together, the components may enable the architecture of the system to define a scalable team of collaboratively autonomous vehicles.

Figure 1:
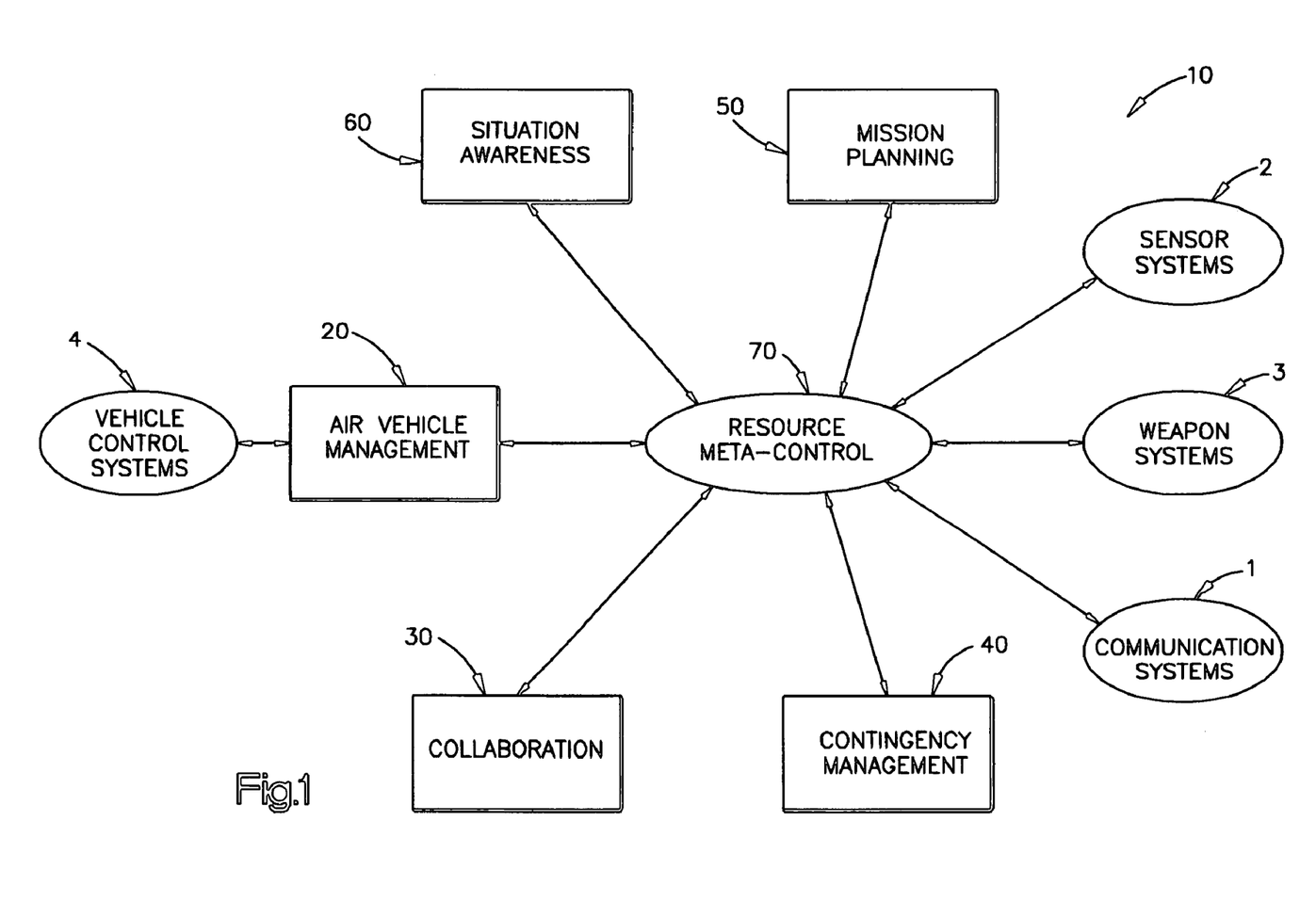
FIG. 1 is an example schematic representation of a system in accordance with the present invention.

An example system 10 may distinguish disciplines and segment the disciplines into six components—Air Vehicle Management (AVM) 20, Collaboration 30, Contingency Management (CM) 40, Mission Planning (MP) 50, Situational Awareness (SA) 60, and Resource Meta-Control (RMC) 70. The components 20, 30, 40, 50, 60, 70 may work in concert to achieve objectives without violating mission constraints.

The Mission Planning component 50, typically onboard the autonomous system 10, may perform pre-mission and dynamic in-mission replanning for a collaborative team. Mission planning may develop collaborative synchronized plans for sensor employment, flight paths, communications, and engagements. The system 10 operates in a hierarchical fashion with mission plans at the highest level—such as Teams A and B recon area ZEBRA, team plans at the next level, and individual vehicle plans at the lowest level. The system 10 may optimize and/or account for factors such as high level mission objectives and constraints, resource allocation for the number of vehicles, payload configuration for different mission objectives, and collaborative use of onboard sensors and external assets to detect, identify, and geo-locate vehicle and dismounted infantry targets of interest. The system 10 may further optimize communication events that support the teams' information dissemination and synchronization requirements, routes that support the planned use of sensors and communications while minimizing threat exposure, and target engagement planning and weapon deployment sequencing.

The Mission Planning component 50 may accept objectives and constraints for planning missions as well as alerts indicating that replanning is required. The Mission Planning component 50 may use geographic information (e.g., terrain, obstacle, and cultural), environmental information (e.g., weather), situational information (e.g., threat locations and capabilities), and vehicle/team and external asset capability information (e.g., payload availability and mobility models). The Mission Planning component 50 may generate mission plans that include travel plans, sensor plans, communication plans, and weapon plans.

At a team level, the Mission Planning component 50 may generate task objectives and constraints for lower level mission planning. The Mission Planning component 50 may then accept, combine, and deconflict plans when lower level mission planning is considered. The Mission Planning component 50 may also accept alerts for changes that require a replan at a team level.

The Contingency Management component 40 may monitor unexpected influences that may affect team plan success, such as payload failure, modified orders, new operational constraints, changing environmental conditions, and/or other unexpected changes in the a Battlespace. The Contingency Management component 40 may feature a team-wide contingency resolution escalation process whereby contingency management may detect a contingency, assess impact, and identify a plan violation. The Contingency Management component 40 may then trigger the Mission Planning component 50 to perform a replan for the affected vehicle locally that may resolve the problem.

If there are tasks that can not be re-planned locally, the Contingency Management component 40 may then collaborate with other team members to reallocate tasks. If there is a reallocation failure, the system 10 may trigger a team replan. If a team replan cannot resolve the situation, the Contingency Management component 40 may alert a controlling element (typically a manned asset) that there is a team planning failure and await new instructions.

The Contingency Management component 40 may implement contingency monitoring and plan impact analysis for most contingency types including air vehicle flight capability degradation, pop-up threats, pop-up targets of opportunity, friendly and neutral movement within the battle space, loss of team members, and mission equipment failures. The Contingency Management component 40 may also determine when an "Emergency Mission Abort" is required and provide a controlling element with control over the level/type of contingency monitoring performed.

The Contingency Management component 40 may receive mission plans and information regarding the changing situation (e.g., new objectives, new constraints, new obstacles, new threats, new targets, and/or changes in vehicle/team capabilities, etc.). The Contingency Management component 40 may issue alerts when plans no longer satisfy objectives and constraints. At a team level, the Contingency Management component 40 may receive alerts of changes that cannot be handled at a lower level and issue alerts to the Mission Planning component 50 for replanning.

The Collaboration component 30 may assign roles for team members, coordinate task execution, and intelligently disseminate information to other team members and/or external assets. The Collaboration component 30 may be responsible for performing team formation behaviors, such as identification and authentication of controlling elements.

The Collaboration component 30 may also enable the system 10 to dynamically re-team for undertaking new missions, reallocate tasks in response to new situations and/or failures, and handoff control required for changing of a controlling element. In addition, the Collaboration component 30 may determine required interactions with the controlling element, exchange information with other autonomous systems in the team and/or external assets, and coordinate execution of planned tasks.

The Collaboration component 30 may accept messages and route the messages to appropriate recipients. The Collaboration component 30 may also process the messages if the Collaboration component itself is an appropriate recipient (e.g., authentication, team membership, teammate synchronization protocol messages, etc.).

The Collaboration component 30 may accept messages for transmission to teammates and/or external assets, assign transmission parameters (e.g., addressee, time sensitivity, acknowledgement required, etc.), and transfer the messages communication systems for transmission. The Collaboration component 30 itself may also generate messages for collaborative functions (e.g., authentication, team membership, teammate synchronization protocol messages, etc.).

The Situational Awareness component 60 may gather data on an external tactical and environmental situation and transform that data into a form useful to other onboard systems. Just as good situation awareness is critical for a pilot or crewmember to perform effectively in a manned system, the intelligent autonomous system 10 may require complete, timely, specific, and relevant information to make "good decisions".

The Situational Awareness component 60 may perform multi-vehicle track-level data fusion and de-confliction of reports from onboard sensors, teammate autonomous systems, and/or external sources thereby providing an estimated and predicted Common Relevant Operating picture (CROP). The Situational Awareness component 60 may also prioritize threats, predict future threat location from an initial reported position, and generate cues to teammate systems in support of mission information needs.

The Air Vehicle Management component 20 may perform several roles for autonomous terrain flight and refine route plans to minimize overall exposure to threats (considering terrain masking), collision risks, and vehicle dynamics. The Air Vehicle Management component 20 may provide reflexive obstacle and threat response capability to enhance overall system survivability by quickly maneuvering a vehicle out of "harm's way" while the system 10 generates a re-plan to achieve mission objectives.

The Air Vehicle Management component 20 may also generate trajectory commands based on a library of maneuver primitives (including agile maneuvers that fully span the available flight envelope) providing enhanced maneuvering effectiveness for survivable threat response. The Air Vehicle Management component 20 may accept travel plans (e.g., flight plans), threat warnings from onboard sensors, and obstacle warnings from obstacle sensors thereby generating maneuvers for the vehicle actuator systems.

The Resource Meta-Control component 70 may provide these services across team members in addition to a particular member of the team. The Resource Meta-Control component 70 may be a software infrastructure component providing processing and memory resources for the other components 20, 30, 40, 50, 60. The Resource Meta-Control component 70 may operate in concert with operating system level resource management functions. The Resource Meta-Control component 70 may perform system management functions, such as processor switchover, memory zeroize, pre-mission and post-mission data exchange, and/or fault isolation.

The Resource Meta-Control component 70 may manage computational resources by performing resource utilization monitoring, resource allocation to agents, resource reclamation and reallocation, resource tracking, and resource scheduling and optimization. An RMC Agent Supervisor may manage agents by agent creation and destruction, agent registration and monitoring, job assignment and status reporting, and/or agent suspension and resumption. The Resource Meta-Control component 70 may provide the other components 20, 30, 40, 50, 60 with access to data by managing publication/subscription interchanges, managing data retention, and/or performing structured queries upon request.

The components 20, 30, 40, 50, 60, 70 of the system 10 work in concert to effect autonomous and collaborative behavior. FIGS. 2-9 are examples of some operational threads through the components 20, 30, 40, 50, 60, 70 of the system 10. The Resource Meta-Control component 70 is not shown for clarity. The Resource Meta-Control component 70 provides the connectivity for the example threads of FIGS. 2-9. FIGS. 1-9 show communication interface/systems 1, sensor interface/systems 2, weapons interface/systems 3, and vehicle control interface/systems 4. These interface/systems 1, 2, 3, 4 are not part of the system 10, but are example adjacent systems with which the system 10 communicates, or "converses".

Figure 2:
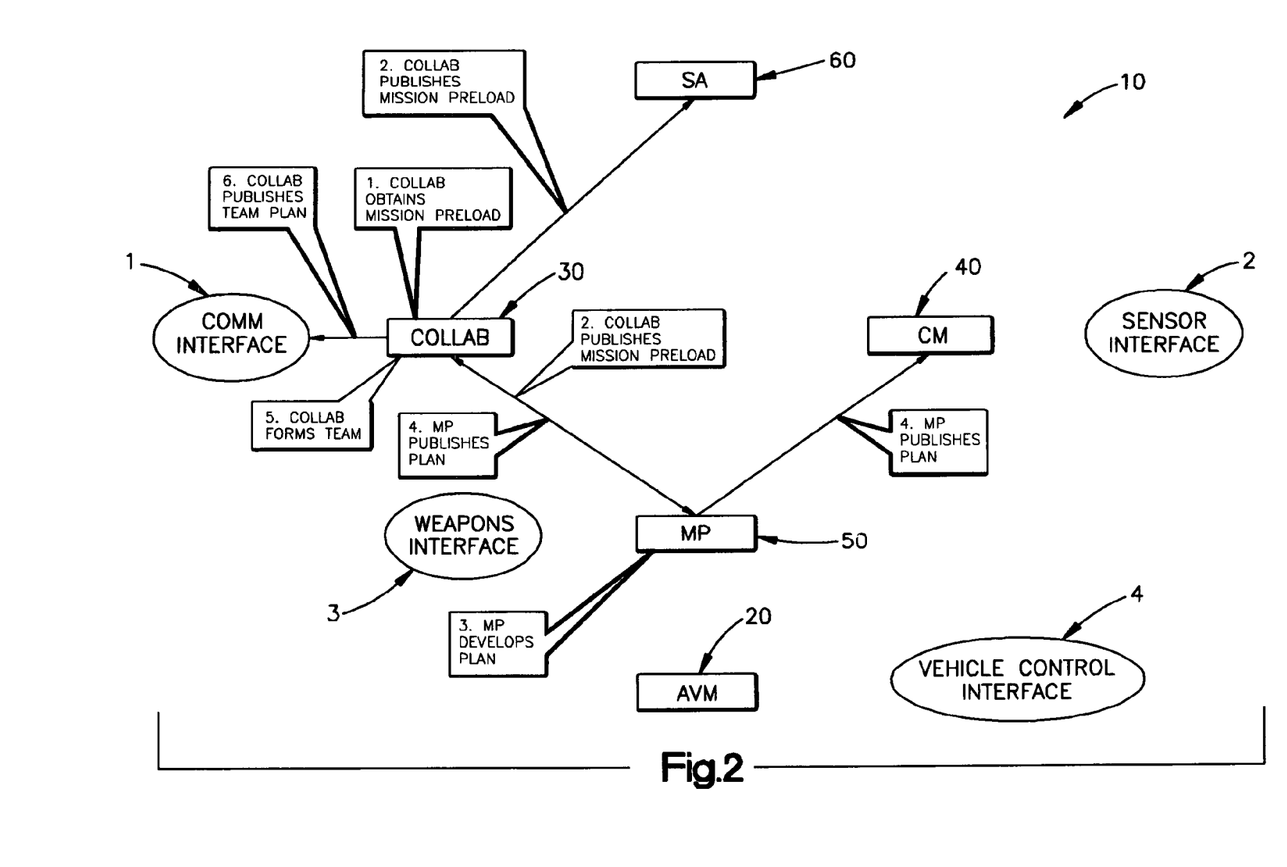
FIG. 2 is an example representation of operation of the system of FIG. 1.

A shown in FIG. 2, a mission may be expressed as a set of objectives and constraints. These objectives and constraints may be input to the system 10 before a mission and the system may develop a mission plan. This plan may then be sent to a controlling element, such as a commander, for approval. However, it may not be necessary for the controlling element to review and approve the plan, but this is typically the case.

Figure 3:
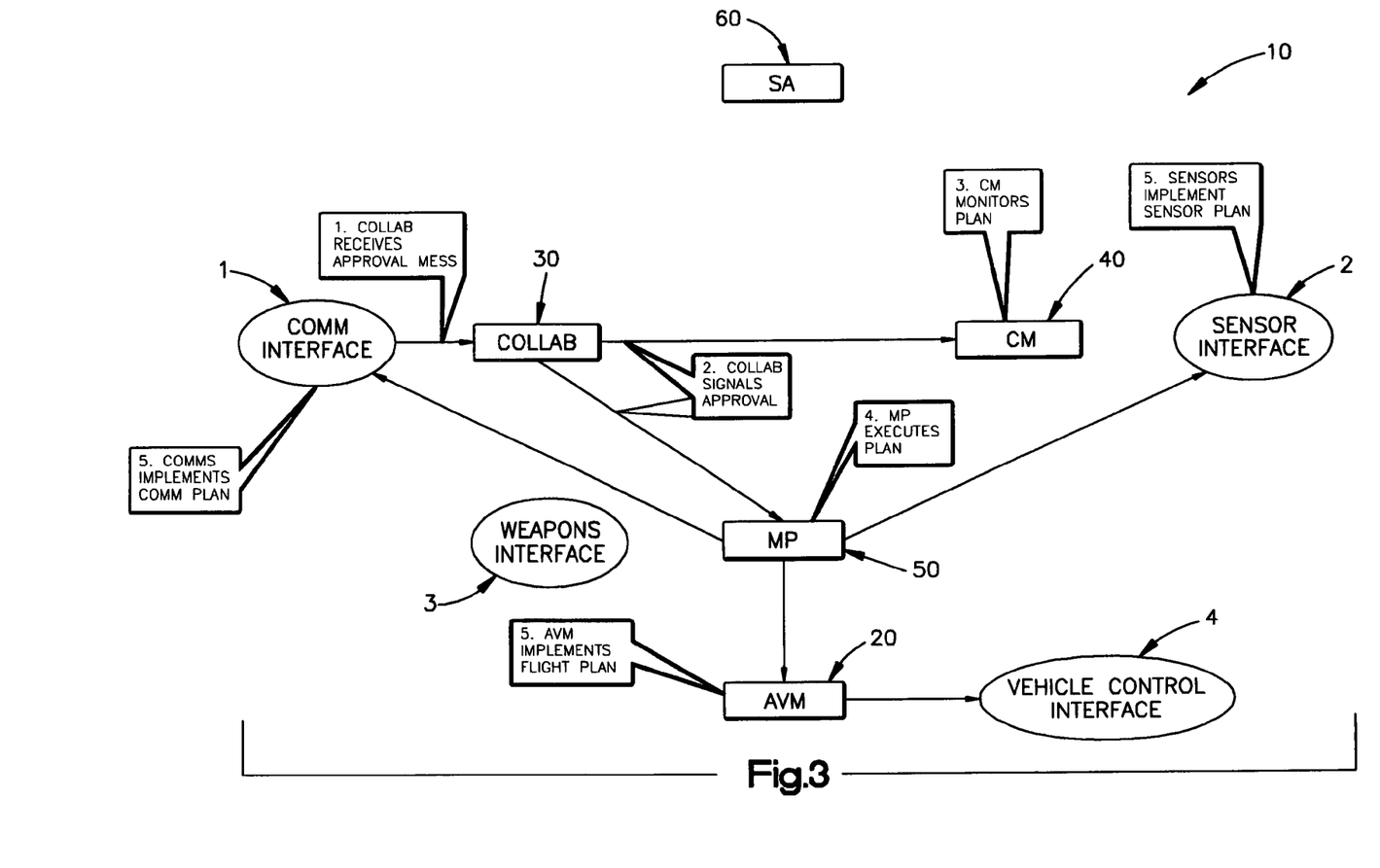
FIG. 3 is another example representation of operation of the system of FIG. 1.

As shown in FIG. 3, approval may be received by the system 10 via the Collaboration component 30. The Contingency Management component 40 may monitor plan execution and the Mission Planning component 50 may execute the plan, sending flight plans to the Air Vehicle Management component 20, communication plans to communication system 1, and sensor plans to the sensor systems 2.

Figure 4:
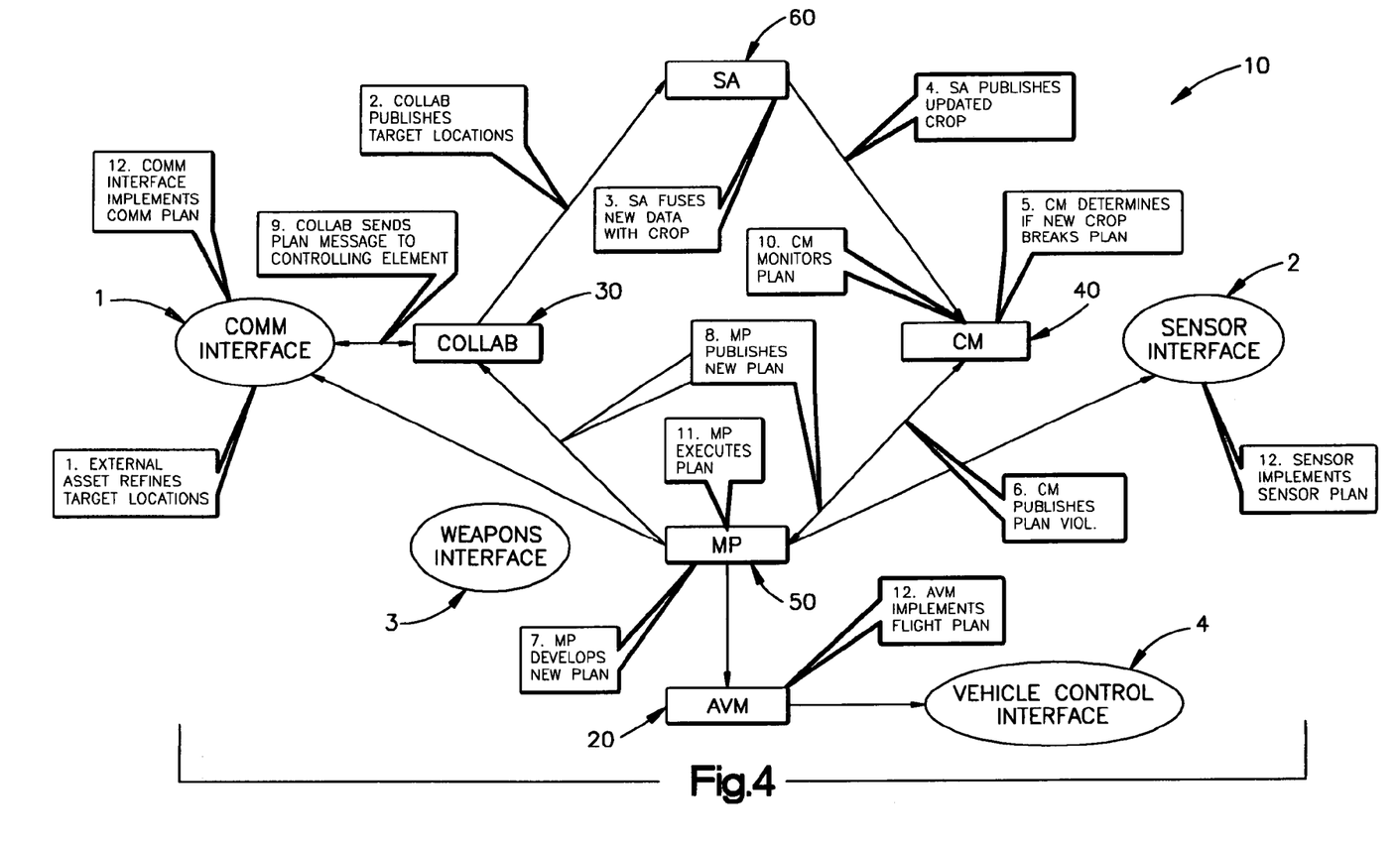
FIG. 4 is still another example representation of operation of the system of FIG. 1.

As shown in FIG. 4, because of constantly changing situations, replans may likely be necessary. Various causes may initiate replanning. In the example of FIG. 4, an external asset causes a replan. A external Intelligence, Surveillance, and Reconnaissance (ISR) asset may refine target locations in the CROP via the Collaboration component 30. The Situation Awareness component 60 may incorporate this new information into the CROP.

The Contingency Management component 40 may examine the CROP, recognize that the current plan will not achieve the mission objectives and alert the Mission Planning component 50. The Mission Planning component 50 may then perform a replan, inform a controlling element via the Collaboration component 30, and begin executing a new plan.

Figure 5:
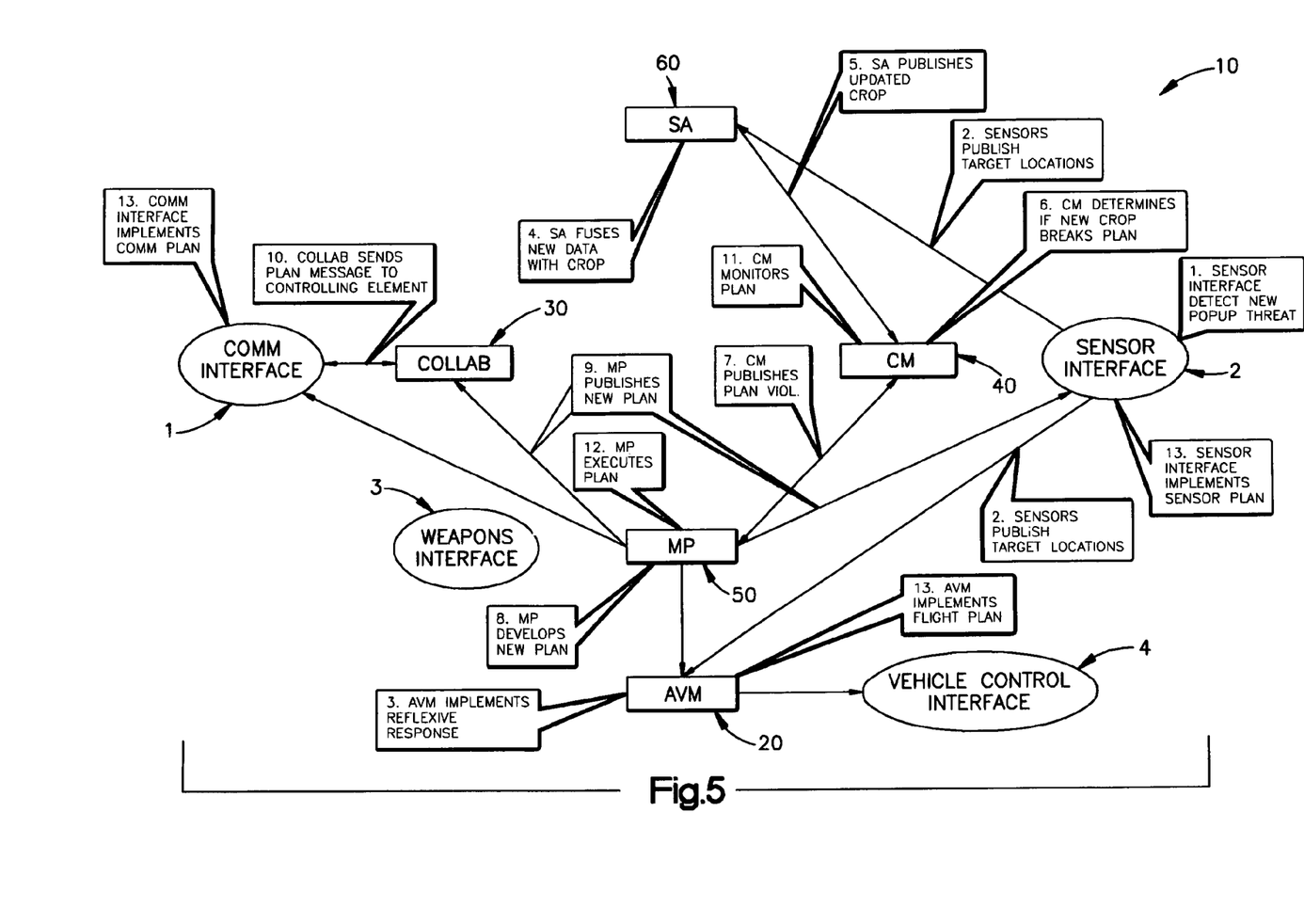
FIG. 5 is yet another example representation of operation of the system of FIG. 1.

In the example of FIG. 4, new information from an external source caused a replan. As shown in FIG. 5, autonomous system 10 itself may recognizes a change. The sensor system 2 may detect a popup threat. The sensor system 2 may alert the Air Vehicle Management component 20, which generates a short-term response. The sensor system 2 may also alert the Situation Awareness component 60, which may incorporate new information into the CROP.

The example thread of FIG. 5 is otherwise similar to the example of FIG. 4. In FIG. 5, however, an optimal course of action is to engage the threat, so the Mission Planning component 50 generates an engagement plan. The rules of engagement may demand that a controlling element provide weapons release authority. Thus, the system 10 may request this authority via the Collaboration component 30.

Figure 6:
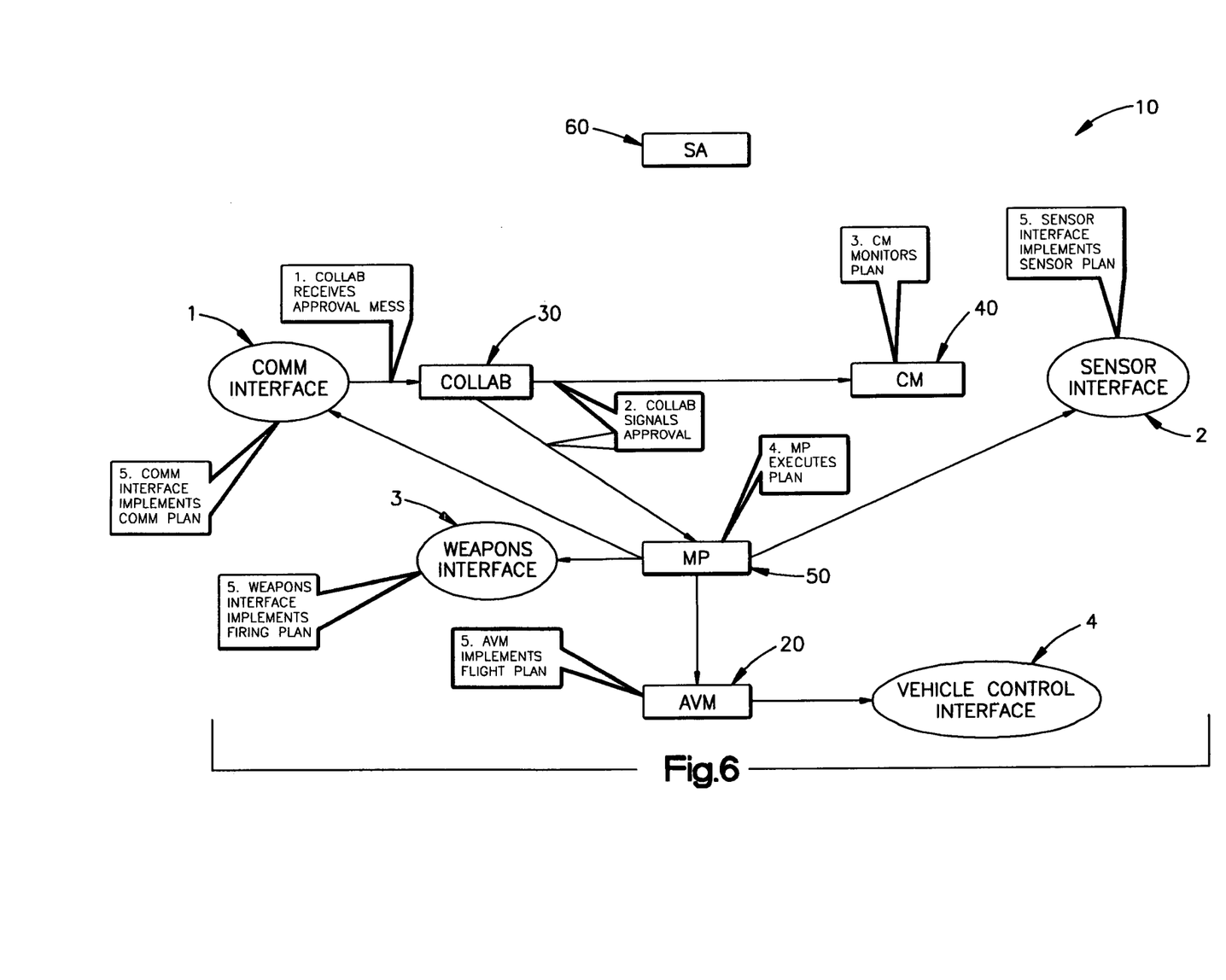
FIG. 6 is still another example representation of operation of the system of FIG. 1.

As shown in FIG. 6, permission to engage may be received via the Collaboration component 30. The Mission Planning component 50 may execute the engagement plan and the Communication Interface 1 and the Air Vehicle Management component 20 may implement the plan resulting in a weapons release.

Figure 7:
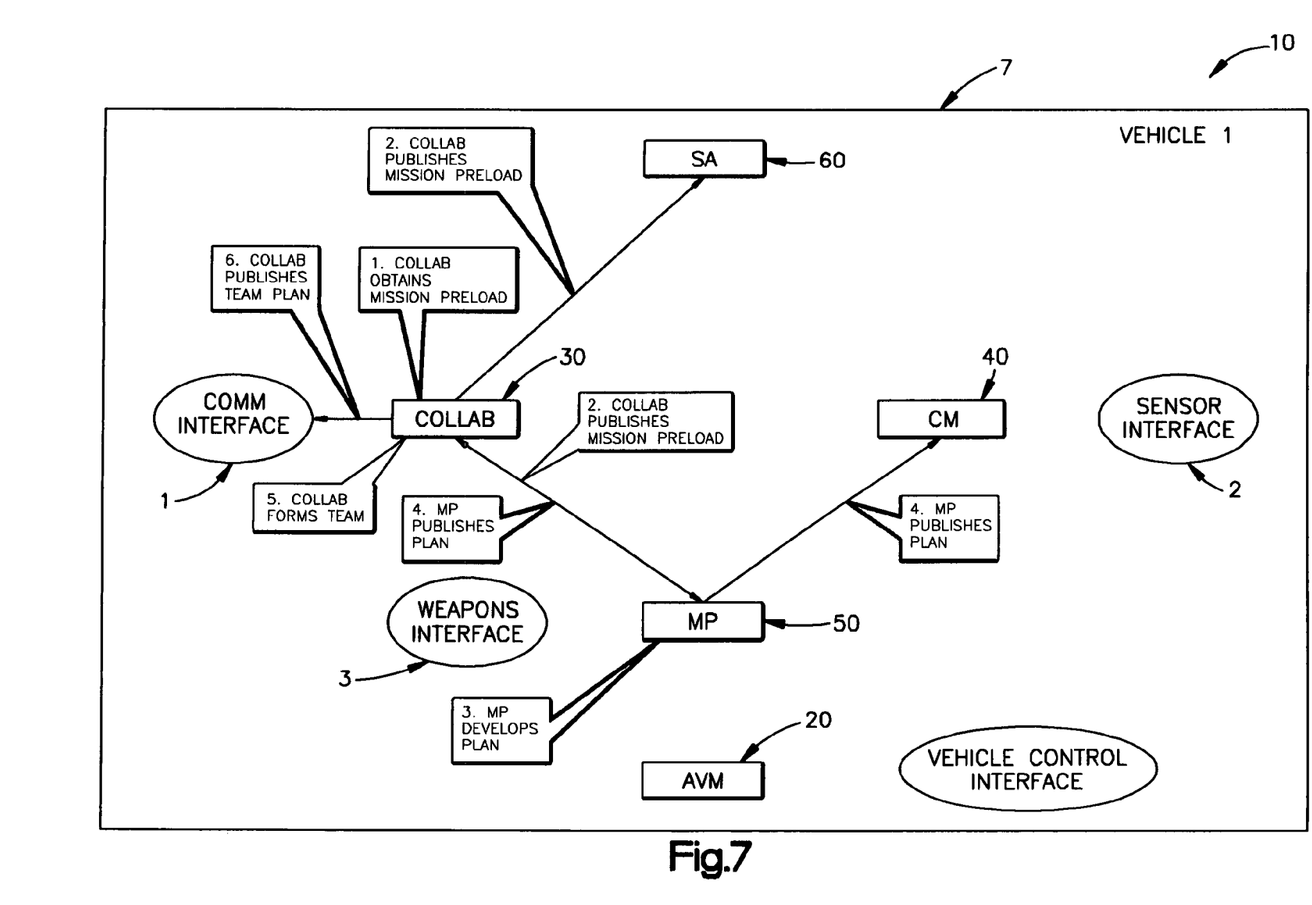
FIG. 7 is yet another example representation of operation of the system of FIG. 1.

The system 10 provides collaborative functionality through the collaborative aspects of the components 20, 30, 40, 50, 60, 70. As shown in FIG. 7, unlike in FIG. 6, the mission plan may be issued to a team. Thus, the collaborative hierarchy of the system 10 becomes evident. As with the above examples, mission objectives and constraints are received by the system 10. One of the constraints may be a list of assets available to carry out a mission. The Mission Planning component 50 may decompose the mission into tasks to be performed by various assets along with the asset requirements.

Also, the Collaboration components may have determined and authenticated the assets. The Collaboration component 30 may assign tasks to the assets based on the given requirements, associate the tasks with the team, and issue the tasks to the team members.

For pre-mission planning, the system 10 may perform all planning on a single vehicle (i.e., vehicle one 7). Additional instances of mission planning may be executed in order to generate the task plans. However, in general, processing may be offloaded to teammates. For replanning with imperfect communications, individual vehicles may receive small task descriptions and perform their own processing rather than an entire detailed task plan.

Figure 8:
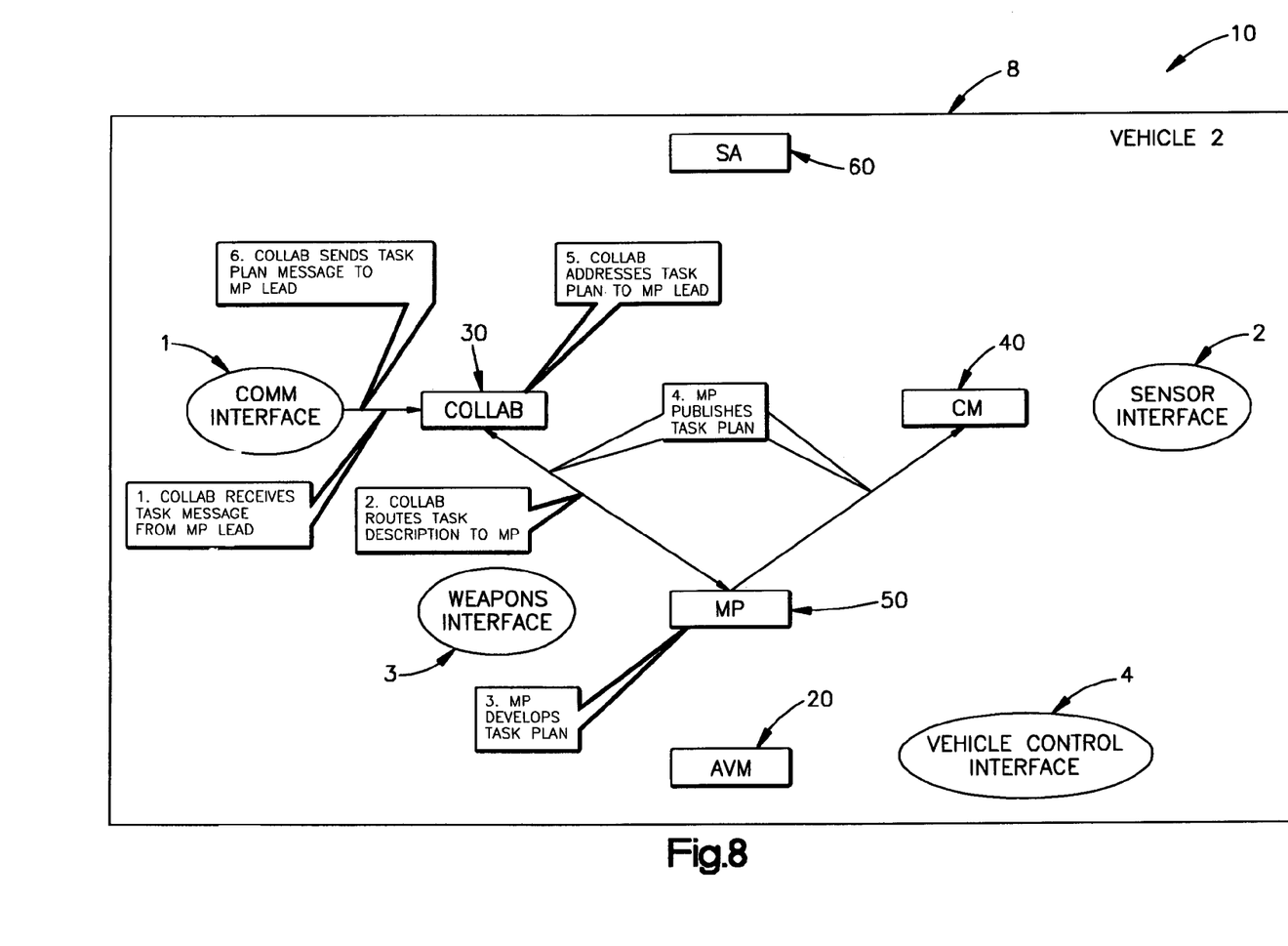
FIG. 8 is still another example representation of operation of the system of FIG. 1.

If multiple vehicles perform planning, other vehicles in a team may receive tasks. FIG. 8 shows the example process on vehicle two 8. The task is received and routed to the Mission Planning component 50. The Mission Planning component 50 may then a task as a single vehicle mission and the thread may continue as in FIG. 2. The system 10 may execute this process on vehicles one through N. The system may thus be scaled to any mission requirements.

Figure 9:
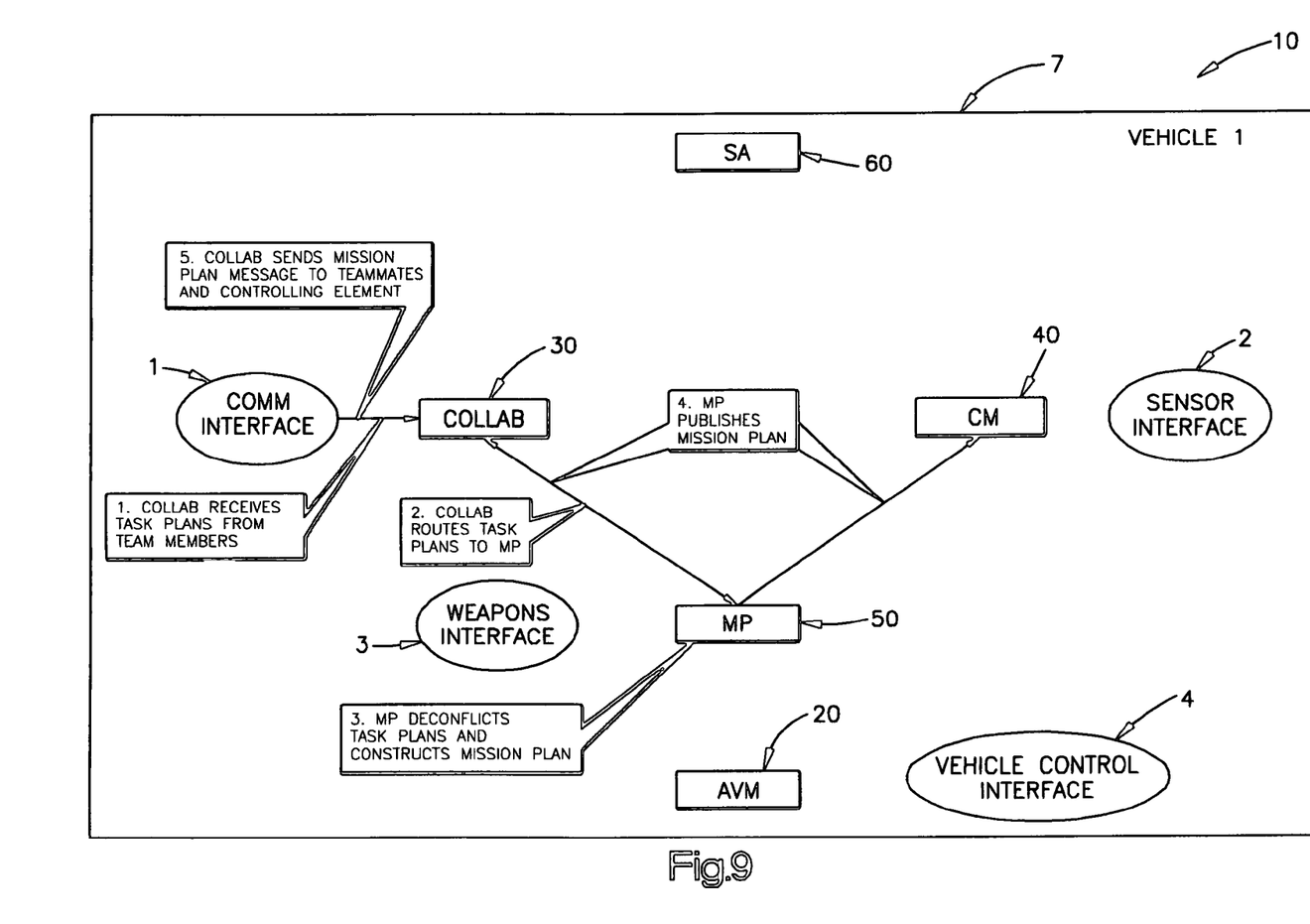
FIG. 9 is yet another example representation of operation of the system of FIG. 1.

As shown in FIG. 9, vehicle one 7 may receive and deconflict a task plan and issue a full mission plan to all team members and the controlling element. Team members may receive a full plan so that the team members are aware of teammate actions when replanning is necessary.

If the controlling element approves a plan, all team members may execute the plan as in FIG. 3. Similarly, reaction to a change may also be collaborative. Because each team member may be aware of the team mission plan, each team member is capable of determining when a detected change may affect the other team members.

For example, consider the pop-up threat response of FIG. 5. A pop-up threat likely is processed in due course due to a team CROP update similar to that shown in FIG. 4.

However, the system 10 may process a discovery of a previously unknown obstacle similar to the example of FIG. 5. If this obstacle affects a team member with a task plan that may cause the team member to encounter the obstacle later, the detecting team member may recognize this situation and alert the Mission Planning component 50 that a team replan may be required.

The system 10 may resolve a loss of capability in a similar fashion. If vehicle one 7 recognizes a sensor failure and a team member must perform the lost sensor coverage in order to achieve objectives of the mission, vehicle one 7 may recognize that the team is affected and trigger a team replan by the system 10.

The architecture of the system 10 offers substantial advantages over conventional approaches. The system 10 may recognize the need to partition components requiring distinct disciplines for analysis, development, and operation, as well as the advantage of autonomy collaborative both with other autonomous systems of the team and systems external to the team. The system 10 is thus more extensible and more scalable than conventional systems.

Because the system 10 may decouple components, analysis and development may be performed by different disciplines with relative independence. Additionally, novel algorithms may be added to the system 10 with minimal disturbance of existing components.

Collaboration is an integral part of the architecture of the system 10—an entire component 30 may be dedicated to collaboration and other components may have collaborative concepts at their core. For example, the Mission Planning component 50 may be hierarchical in nature so that teams may be formed and reformed with tasks allocated and reallocated to team members.

Contingency management is hierarchical in nature, supporting the concept of issues being addressed at a team level. These issues are typically not addressed, or addressed as an afterthought, in conventional approaches. Because collaboration may be incorporated at the core of components of the system 10, the architecture of the system is scalable.

The architecture may be capable of functioning with other like architectures such that vehicles of a team and teams may function synergistically. The architecture of the system 10 may exist for a variable number of autonomous team members. Thus, intermittent communication between team members or complete loss of a team member may be processed seamlessly.

Figure 10:
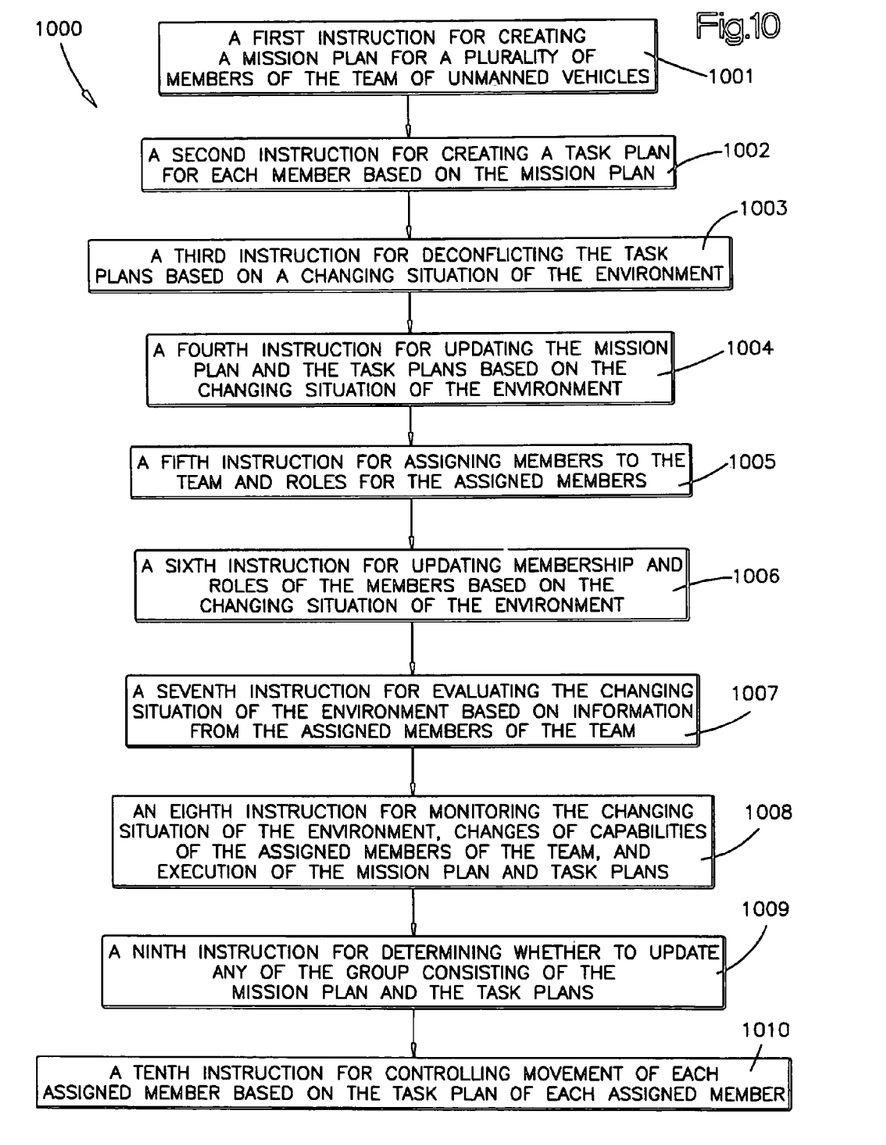
FIG. 10 is an example schematic representation of a computer program product in accordance with the present invention.

As shown in FIG. 10, an example computer program product 1000 in accordance with the present invention collaboratively and autonomously plans and controls a team of unmanned vehicles within an environment. The computer program product includes: a first instruction 1001 for creating a mission plan for a plurality of members of the team of unmanned vehicles; a second instruction 1002 for creating a task plan for an each member based on the mission plan; a third instruction 1003 for deconflicting the task plans based on a changing situation of the environment; a fourth instruction 1004 for updating the mission plan and the task plans based on the changing situation of the environment; a fifth instruction 1005 for assigning members to the team and roles for the assigned members; a sixth instruction 1006 for updating membership and roles of the members based on the changing situation of the environment; a seventh instruction 1007 for evaluating the changing situation of the environment based on information from the assigned members of the team; an eighth instruction 1008 for monitoring the changing situation of the environment, changes of capabilities of the assigned members of the team, and execution of the mission plan and task plans; a ninth instruction 1009 for determining whether to update any of the group consisting of the mission plan and the task plans; and a tenth instruction 1010 for controlling movement of each assigned member based on the task plan of each assigned member.

In order to provide a context for the various aspects of the present invention, the following discussion is intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications argument model. However, some, if not all aspects of the invention can be practiced on stand-alone computers. In a distributed computing environment, program modules may be located in both local and remote memory storage devices.

An exemplary system for implementing the various aspects of the invention includes a conventional server computer, including a processing unit, a system memory, and a system bus that couples various system components including the system memory to the processing unit. The processing unit may be any of various commercially available processors. Dual microprocessors and other multi-processor architectures also can be used as the processing unit. The system bus may be any of several types of bus structure including a memory bus or memory controller, a peripheral bus, and a local bus using any of a variety of conventional bus architectures. The system memory includes read only memory (ROM) and random access memory (RAM). A basic input/output system (BIOS), containing the basic routines that help to transfer information between elements within the server computer, such as during start-up, is stored in ROM.

The server computer further includes a hard disk drive, a magnetic disk drive, e.g., to read from or write to a removable disk, and an optical disk drive, e.g., for reading a CD-ROM disk or to read from or write to other optical media. The hard disk drive, magnetic disk drive, and optical disk drive are connected to the system bus by a hard disk drive interface, a magnetic disk drive interface, and an optical drive interface, respectively. The drives and their associated computer-readable media provide nonvolatile storage of data, data structures, computer-executable instructions, etc., for the server computer. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM, including an operating system, one or more application programs, other program modules, and program data. A user may enter commands and information into the server computer through a keyboard and a pointing device, such as a mouse. Other input devices (not shown) may include a microphone, a joystick, a game pad, a satellite dish, a scanner, or the like. These and other input devices are often connected to the processing unit through a serial port interface that is coupled to the system bus, but may be connected by other interfaces, such as a parallel port, a game port or a universal serial bus (USB). A monitor or other type of display device is also connected to the system bus via an interface, such as a video adapter. In addition to the monitor, computers typically include other peripheral output devices (not shown), such as speaker and printers.

The server computer may operate in a networked environment using logical connections to one or more remote computers, such as a remote client computer. The remote computer may be a workstation, a server computer, a router, a peer device or other common network node, and typically includes many or all of the elements described relative to the server computer. The logical connections include a local area network (LAN) and a wide area network (WAN). Such networking environments are commonplace in offices, enterprise-wide computer networks, intranets and the internet.

When used in a LAN networking environment, the server computer is connected to the local network through a network interface or adapter. When used in a WAN networking environment, the server computer typically includes a modem, or is connected to a communications server on the LAN, or has other means for establishing communications over the wide area network, such as the internet. The modem, which may be internal or external, is connected to the system bus via the serial port interface. In a networked environment, program modules depicted relative to the server computer, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer, unless otherwise indicated. Such acts and operations are sometimes referred to as being computer-executed. It will be appreciated that the acts and symbolically represented operations include the manipulation by the processing unit of electrical signals representing data bits which causes a resulting transformation or reduction of the electrical signal representation, and the maintenance of data bits at memory locations in the memory system (including the system memory, hard drive, floppy disks, and CD-ROM) to thereby reconfigure or otherwise alter the computer system's operation, as well as other processing of signals. The memory locations where such data bits are maintained are physical locations that have particular electrical, magnetic, or optical properties corresponding to the data bits.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A system for collaboratively and autonomously planning and controlling a team of unmanned vehicles within an environment, said system comprising:
   a mission planning component for creating a mission plan for a plurality of members of the team of unmanned vehicles, said mission planning component creating a task plan for an each said member based on the mission plan, said mission planning component deconflicting the task plans based on a changing situation of the environment, said mission planning component updating the mission plan and the task plans based on the changing situation of the environment;
   a collaboration component for assigning members to the team and roles for the assigned members, said collaboration component updating membership and roles of the members based on the changing situation of the environment;
   a situational awareness component for evaluating the changing situation of the environment based on information from the assigned members of the team;
   a contingency management component for monitoring the changing situation of the environment, changes of capabilities of the assigned members of the team, and execution of the mission plan and task plans, said contingency management component determining whether to update any of the group consisting of the mission plan and the task plans; and
   a vehicle management component for controlling movement of each assigned member based on the task plan of each assigned member.

2. The system as set forth in claim 1 further including a resource meta-control component for providing processing and memory resources for each assigned member of the team.

3. The system as set forth in claim 1 wherein said system collaboratively and autonomously plans and controls a plurality of teams of unmanned vehicles within the environment.

4. The system as set forth in claim 1 wherein said mission planning component is located onboard a member of the team of vehicles.

5. The system as set forth in claim 1 wherein said mission planning component develops a collaborative synchronized plan for the team of vehicles, said plan governing sensor deployment, flight paths, communication, and engagements.

6. The system as set forth in claim 1 wherein said mission planning component further governs information dissemination to the members of the team of vehicles.

7. The system as set forth in claim 1 wherein said contingency management component detects a contingency, assessing an impact of the contingency, and identifying the contingency as a mission plan violation.

8. The system as set forth in claim 1 wherein said contingency management component issues alerts to the assigned members that the mission plan no longer satisfies objectives and constraints.

9. The system as set forth in claim 1 wherein said collaboration component dynamically re-teams the assigned members and other members for executing another mission plan.

10. A computer readable medium having a computer program product for collaboratively and autonomously planning and controlling a team of unmanned vehicles within an environment, said computer program product comprising:
   a first instruction for creating a mission plan for a plurality of members of the team of unmanned vehicles;
   a second instruction for creating a task plan for an each member based on the mission plan;
   a third instruction for deconflicting the task plans based on a changing situation of the environment;
   a fourth instruction for updating the mission plan and the task plans based on the changing situation of the environment;
   a fifth instruction for assigning members to the team and roles for the assigned members
   a sixth instruction for updating membership and roles of the members based on the changing situation of the environment;
   a seventh instruction for evaluating the changing situation of the environment based on information from the assigned members of the team;
   an eighth instruction for monitoring the changing situation of the environment, changes of capabilities of the assigned members of the team, and execution of the mission plan and task plans;
   a ninth instruction for determining whether to update any of the group consisting of the mission plan and the task plans; and
   a tenth instruction for controlling movement of each assigned member based on the task plan of each assigned member.

11. The computer readable medium as set forth in claim 10 further including an eleventh instruction for distinguishing disciplines of each assigned member.

12. The computer readable medium as set forth in claim 10 further including an eleventh instruction for collaborating control of each assigned member with assets external to the team of vehicles.

13. The computer readable medium as set forth in claim 10 further including an eleventh instruction for performing a re-plan of the mission plan due to a contingency encountered by one of the assigned members.

14. The computer readable medium as set forth in claim 10 further including an eleventh instruction for detecting, identifying, and geo-locating each assigned member.

15. The computer readable medium as set forth in claim 10 further including an eleventh instruction for utilizing geographic information for performing said first instruction.

16. The computer readable medium as set forth in claim 10 further including an eleventh instruction for reallocating said task plans of said members.

17. The computer readable medium as set forth in claim 10 further including an eleventh instruction for creating another mission plan utilizing objectives, constraints, targets, and team capabilities.

18. The computer readable medium as set forth in claim 10 further including an eleventh instruction for routing messages to appropriate members of the assigned members.

19. The computer readable medium as set forth in claim 10 further including an eleventh instruction for gathering tactical and environmental information.

20. A method for collaboratively and autonomously planning and controlling a team of unmanned vehicles within an environment, said method comprising the steps of:

creating a mission plan for a plurality of members of the team of unmanned vehicles;

creating a task plan for an each member based on the mission plan;

deconflicting the task plans based on a changing situation of the environment;

updating the mission plan and the task plans based on the changing situation of the environment;

assigning members to the team and roles for the assigned members;

updating membership and roles of the members based on the changing situation of the environment;

evaluating the changing situation of the environment based on information from the assigned members of the team;

monitoring the changing situation of the environment, changes of capabilities of the assigned members of the team, and execution of the mission plan and task plans;

determining whether to update any of the group consisting of the mission plan and the task plans; and controlling movement of each assigned member based on the task plan of each assigned member.

* * * * *